United States Patent [19]

Sienkowski et al.

[11] Patent Number: 5,358,665
[45] Date of Patent: Oct. 25, 1994

[54] ANTISTATIC COMPOSITION COMPRISING DIETHANOL AMIDE AND HYDROXY-FUNCTIONAL AMIDE ESTER

[75] Inventors: Kenneth J. Sienkowski, Bethlehem; Paritosh M. Chakrabarti, Pittsburgh, both of Pa.

[73] Assignee: PPG Industries, Inc., Pittsburgh, Pa.

[21] Appl. No.: 748,123

[22] Filed: Aug. 21, 1991

Related U.S. Application Data

[63] Continuation-in-part of Ser. No. 498,200, Mar. 23, 1990, abandoned.

[51] Int. Cl.$^5$ .............................................. H01B 1/00
[52] U.S. Cl. ................................. 252/500; 524/219; 524/224; 524/226; 524/910; 524/913
[58] Field of Search ................ 252/8.6, 8.8, 544, 547, 252/548, 500, 518; 524/219, 224, 226, 910, 913

[56] References Cited

U.S. PATENT DOCUMENTS

| | | | |
|---|---|---|---|
| 2,002,613 | 2/1933 | Orthner et al. | 260/124 |
| 3,223,545 | 12/1965 | Gallaugher et al. | 106/287 |
| 3,257,436 | 6/1966 | Lindner | 252/548 |
| 3,679,468 | 7/1972 | Feinauer | 117/138.8 F |
| 3,992,434 | 11/1976 | Oppelt et al. | 260/473 |
| 4,092,281 | 5/1978 | Bertrand | 260/23 H |
| 4,808,448 | 2/1989 | Cox | 428/36.5 |
| 4,921,622 | 5/1990 | Kato et al. | 252/8.9 |
| 5,001,015 | 3/1991 | Havens | 524/317 |

FOREIGN PATENT DOCUMENTS 384665  6/1931  United Kingdom .

OTHER PUBLICATIONS

Schick, Martin J. Nonionic Surfactants 1967.

*Primary Examiner*—Paul Lieberman
*Assistant Examiner*—M. Kopec
*Attorney, Agent, or Firm*—George D. Morris

[57] ABSTRACT

Diethanolamine and monocarboxylic acid ester represented by the formula:

$$RC(O)OR'$$

are reacted to produce a reaction mixture comprising diethanol amide of monocarboxylic acid represented by the formula:

$$RC(O)N(CH_2CH_2OH)_2$$

and hydroxy-functional amide ester represented by the formula:

$$\begin{array}{c} CH_2CH_2OH \\ | \\ RC(O)NCH_2CH_2OC(O)R \end{array}$$

wherein each R is independently a hydrophobic hydrocarbon group and R' is an alkyl group containing from 1 to about 18 carbon atoms. The reaction mixture is useful as an antistatic composition for formulating with polymers, especially polyolefins.

15 Claims, No Drawings

ANTISTATIC COMPOSITION COMPRISING DIETHANOL AMIDE AND HYDROXY-FUNCTIONAL AMIDE ESTER

RELATED APPLICATION

This application is a continuation-in-part of application Ser. No. 498,200, filed Mar. 23, 1990 now abandoned.

BACKGROUND OF THE INVENTION

Diethanol amides of long chain monocarboxylic acids are known in the art as antistatic compounds (hereinafter "antistats") useful for incorporation into polyolefin polymers, especially polyethylene, polypropylene and/or copolymers of ethylene and propylene. One particularly demanding use for polyethylene containing such an antistat is as packaging material for packaging electronic components which comprise polycarbonate.

The commercial process for producing diethanol amide of long chain monocarboxylic acid comprises two separately conducted steps. In the first step, diethanolamine and a long chain monocarboxylic acid, alkyl ester (for example, methyl laurate), are reacted in the presence of an excess of the diethanolamine to produce a mixture comprising the diethanol amide of the long chain monocarboxylic acid and diethanolamine. Since the reaction otherwise tends to proceed only slowly, it is often conducted in the presence of a catalytic amount of a basic catalyst such as sodium methoxide which increases the reaction rate. The excess diethanolamine also serves to increase the reaction rate and to drive the reaction to substantial completion. In the case of methyl laurate, the temperature of the reaction is above the boiling point of methanol under the prevailing pressure and the reaction is customarily conducted under a slight vacuum with a nitrogen purge to sweep the methanol away substantially as it is formed. The reaction may be represented as follows:

$$CH_3(CH_2)_{10}C(O)OCH_3 + HN(CH_2CH_2OH)_2 \xrightarrow{NaOCH_3}$$
(excess)

$$CH_3(CH_2)_{10}C(O)N(CH_2CH_2OH)_2 +$$

$$HN(CH_2CH_2OH) + CH_3OH \uparrow$$
(residual)

Diethanolamine is not an antistat and its presence serves to dilute the antistatic properties of the composition. Most importantly, however, diethanolamine reacts with the polycarbonate of the electronic components the packaging was intended to protect.

The second step of the commercial process therefore converts the residual diethanolamine to a material less harmful to polycarbonate. Long chain monocarboxylic acid (for example, lauric acid) is added to the first reaction mixture and reacted with the residual diethanolamine to form long chain monocarboxylic acid, N,N-bis(2-hydroxyethyl)ammonium salt, which ordinarily constitutes from about 5 to about 10 percent by weight of the resulting second reaction mixture. The reaction may be represented as follows:

$$CH_3(CH_2)_{10}C(O)OH + HN(CH_2CH_2OH)_2 \rightarrow CH_3(CH_2)_{10}C(O)O^-H_2N^+(CH_2CH_2OH)_2$$

The ammonium salt is not an antistat and its presence dilutes the antistatic properties of the product composition. The product is often compounded with polyethylene at elevated temperatures, but at those temperatures the antistat composition does not have good thermal stability and a good deal of the ammonium salt degrades and forms volatile byproducts. Although the ammonium salt of fatty acids does not degrade polycarbonate as does diethanolamine, it can induce the corrosion of copper, solder, and other parts of the electronic components. Electronic components, and especially assembled circuit boards containing electronic components, are usually expensive and often must be stored for long periods of time in their packaging. The presence of more than inconsequential amounts of the ammonium salt of fatty acids renders the composition generally unfit for use in polyethylene packaging of electronic components and assembled circuit boards containing electronic components. As a matter of fact, the electronics packaging industry requires antistats that are substantially free from fatty acids and/or their salts.

THE INVENTION

It has now been discovered that diethanol amides of monocarboxylic acids (hereinafter "diethanol amide") may be produced together with one or more compounds having concurrent amide, hydroxyl, and ester functionalities and some antistatic properties (hereinafter "hydroxy-functional amide ester"). The hydroxy-functional amide ester does not induce corrosion of copper or other materials normally present in electronic components. Since the hydroxy-functional amide ester has some antistatic properties of its own (although ordinarily not as pronounced as those of the diethanol amide) it has a lesser tendency than a non-antistat to dilute the antistatic properties of an antistatic composition also containing the diethanol amide.

Accordingly, one embodiment of the invention is an antistatic composition comprising diethanol amide of monocarboxylic acid represented by the formula:

$$RC(O)N(CH_2CH_2OH)_2$$

and hydroxy-functional amide ester represented by the formula:

$$\overset{CH_2CH_2OH}{\underset{|}{RC(O)NCH_2CH_2OC(O)R}}$$

wherein: (a) each R is independently a hydrophobic hydrocarbon group, (b) the molar ratio of the hydroxy-functional amide ester to the diethanol amide is in the range of from about 0.01:1 to about 0.25:1, and (c) the molar ratio of diethanolamine to the sum of the diethanol amide and the hydroxy-functional amide ester is less than about 0.1.

Yet another embodiment of the invention is a polymeric composition comprising polyolefin in admixture with an antistatic composition, the antistatic composition comprising diethanol amide of monocarboxylic acid represented by the formula:

$$RC(O)N(CH_2CH_2OH)_2$$

and hydroxy-functional amide ester represented by the formula:

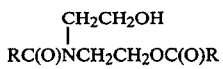
$$RC(O)\overset{CH_2CH_2OH}{\underset{|}{N}}CH_2CH_2OC(O)R$$

wherein: (a) each R is independently a hydrophobic hydrocarbon group, (b) the molar ratio of the hydroxy-functional amide ester to the diethanol amide is in the range of from about 0.01:1 to about 0.25:1, and (c) the molar ratio of diethanolamine to the sum of the diethanol amide and the hydroxy-functional amide ester is less than about 0.1.

Yet another embodiment of the invention is a process comprising reacting diethanolamine and monocarboxylic acid ester represented by the formula:

$$RC(O)OR'$$

to produce a reaction mixture comprising diethanol amide of monocarboxylic acid represented by the formula:

$$RC(O)N(CH_2CH_2OH)_2$$

and hydroxy-functional amide ester represented by the formula:

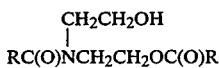
$$RC(O)\overset{CH_2CH_2OH}{\underset{|}{N}}CH_2CH_2OC(O)R$$

wherein: (a) each R is independently a hydrophobic hydrocarbon group, (b) R' is an alkyl group containing from 1 to about 18 carbon atoms, (c) the molar ratio of the hydroxy-functional amide ester to the diethanol amide is in the range of from about 0.01:1 to about 0.25:1, and (d) the molar ratio of diethanolamine to the sum of the diethanol amide and the hydroxy-functional amide ester is less than about 0.1.

For any particular hydroxy-functional amide ester compound the R-groups may be the same or they may be different. Either or both of the R-groups of the hydroxy-functional amide ester compound may be the same as or different from that of the diethanol amide. The diethanol amide may be a single compound or it may be a mixture of different compounds. Similarly, the hydroxy-functional amide ester may be a single compound or it may be a mixture of different compounds.

In general each R is independently a hydrophobic hydrocarbon group. The various R's may be the same or they may be different. The hydrophobic hydrocarbon groups are well known and commonly used to impart hydrophobic functionality to surfactants. In most cases the hydrophobic hydrocarbon group contains from about 7 to about 29 carbon atoms. In many cases the hydrophobic hydrocarbon group contains from about 9 to about 17 carbon atoms. From about 9 to about 13 carbon atoms is preferred. Examples of hydrophobic hydrocarbon groups which may be used include straight or branched alkyl groups containing from about 7 to about 29 carbon atoms, straight or branched alkenyl containing from about 9 to about 21 carbon atoms, straight or branched alkadienyl containing from about 13 to about 21 carbon atoms, and

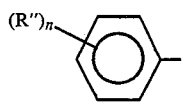

(I)

wherein each R″ is independently straight or branched alkyl and the average value of n is in the range of from 0 to about 2.

When R is alkyl, it ordinarily contains from about 7 to about 29 carbon atoms. In many cases when R is alkyl, it contains from about 9 to about 17 carbon atoms. From about 9 to about 15 carbon atoms is preferred.

When R is alkenyl, it usually contains from about 9 to about 21 carbon atoms. Often when R is alkenyl, it contains from about 13 to about 21 carbon atoms. From about 17 to about 21 carbon atoms is preferred.

When R is alkadienyl, it ordinarily contains form about 13 to about 21 carbon atoms. About 17 carbon atoms is preferred.

When R is alkyl, alkenyl, or alkadienyl, it is preferably straight.

When R is the group of Formula (I), The average value of n is in the range of from 0 to about 2. Preferably the average value of n is about 1. Each R″ is independently straight or branched alkyl containing from about 8 to about 12 carbon atoms. From about 8 to about 9 carbon atoms is preferred. Straight alkyl is preferred.

The preferred hydrophobic hydrocarbon groups are hydrophobic hydrocarbon groups corresponding to those attached to the carboxyl groups of long chain monocarboxylic acids. The especially preferred hydrophobic hydrocarbon groups are hydrophobic hydrocarbon groups corresponding to those attached to the carboxyl groups of long chain monocarboxylic acids derived from the triglycerides of natural fats or oils. Undecyl is particularly preferred.

R' is usually an alkyl group containing from 1 to about 18 carbon atoms. The alkyl group often contains from 1 to about 4 carbon atoms. One or two carbon atoms is preferred. The especially preferred alkyl group is methyl. When the alkyl group contains more than 2 carbon atoms, it may be straight or branched, but straight alkyl is preferred.

The reaction may be represented as follows:

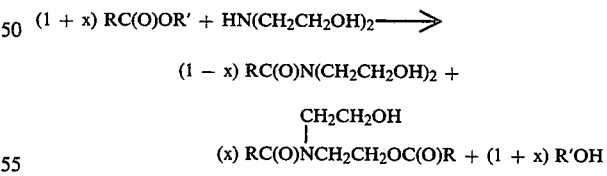

$$(1 + x) RC(O)OR' + HN(CH_2CH_2OH)_2 \longrightarrow$$
$$(1 - x) RC(O)N(CH_2CH_2OH)_2 +$$
$$(x) RC(O)\overset{CH_2CH_2OH}{\underset{|}{N}}CH_2CH_2OC(O)R + (1 + x) R'OH$$

wherein the various R-groups and R'-groups are as discussed above. The value of x is usually in the range of from about 0.01 to about 0.2. In many cases the value of x is in tile range of from about 0.03 to about 0.15. From about 0.06 to about 0.1 is preferred. One monocarboxylic acid ester or a mixture of monocarboxylic acid esters may be used as desired.

The monocarboxylic acid ester and the diethanolamine are ultimately introduced to the reaction at about (1+x) moles of monocarboxylic acid ester per mole of diethanolamine. The additions of the reactants may be made simultaneously or sequentially in any order. The reaction may be conducted continuously, semi-continuously, batchwise, or semi-batchwise as desired.

Since the reaction otherwise tends to proceed only slowly, it is often conducted in the presence of a catalytic amount of a basic catalyst such as alkali metal alkoxide which increases the reaction rate. Ordinarily the alkali metal alkoxide contains from 1 to about 18 carbon atoms. Frequently the alkali metal alkoxide contains from 1 to about 2 carbon atoms. Preferably the alkali metal alkoxide is alkali metal methoxide. The alkali metal alkoxide is frequently sodium alkoxide or potassium alkoxide. Sodium alkoxide is preferred. The particularly preferred alkali metal alkoxide is sodium methoxide. Other basic catalysts may be used when desired.

The ratio of the weight of the basic catalyst introduced to the reaction to the sum of the weights of the monocarboxylic acid ester and diethanolamine introduced is ordinarily in the range of from about 0.0003 to about 0.005, although greater ratios may be used when desired. Frequently the ratio is in the range of from about 0.0003 to about 0.001.

The reaction is a liquid phase reaction. In many cases the reaction medium comprises two liquid phases. Methyl laurate and diethanolamine, for example, are substantially immiscible.

Usually the reaction is a neat reaction, although substantially inert solvent may be used if desired.

In most cases the reaction is conducted under substantially anhydrous conditions.

The reaction is frequently conducted at temperatures in the range of from about 80° C. to about 150° C., although greater or lesser temperatures may be used when desired. In many cases, the reaction temperature is in the range of from about 80° C. to about 100° C. From about 80° C. to about 85° C. is preferred.

A benefit to employing monocarboxylic acid esters where R' contains one or only a few carbon atoms is that it can be swept out with an inert gas purge substantially as it is formed. In those cases where the boiling point of the byproduct alkanol is high such that it cannot be swept out as it is formed, it may be allowed to remain in the reaction mixture and then removed at the completion of the reaction by conventional separation procedures well known to the art, such as for example, distillation under reduced pressure.

The pressure under which the reaction is conducted may vary widely. The pressure may be below, at, or above ambient atmospheric pressure. In most cases the reaction is conducted at about ambient atmospheric pressure or at a pressure that is below ambient atmospheric pressure. The pressure is frequently in the range of from about 0.13 to about 101 kilopascals, absolute. From about 1.3 to about 13.3 kilopascals, absolute, is preferred.

The molar ratio of the hydroxy-functional amide ester to the diethanol amide in the antistatic compositions of the second embodiment of the invention is ordinarily in the range of from about 0.01:1 to about 0.25:1. Often the molar ratio is in the range of from about 0.03:1 to about 0.18:1. From about 0.06:1 to about 0.12:1 is preferred.

The antistatic composition comprising both diethanol amide and hydroxy-functional amide ester is especially useful for compounding with various polymers, especially but not necessarily the polyolefins, to impart antistatic characteristics to the resulting composition. The preferred polyolefins are polyethylene, polypropylene, and copolymers of ethylene and propylene. Since the antistatic composition may be compounded with polymer to form a concentrate which is then compounded with additional polymer to form the final end-use composition, the relative amounts of diethanol amide, hydroxy-functional amide ester, and polymer may vary widely. In most cases the ratio of the sum of the weights of the diethanol amide and the hydroxy-functional amide ester to the weight of the polymer is in the range of from about 0.0005:1 to about 0.05:1. Frequently the ratio of the sum of the weights of the diethanol amide and the hydroxy-functional amide ester to the weight of the polymer is in the range of from about 0.001:1 to about 0.01:1. From about 0.0025:1 to about 0.0075:1 is preferred.

The polymeric compositions of the invention may optionally also contain plasticizers, fire retardants, pigments, dyes, tints, resinous pigment dispersants, grinding vehicles, and the like. The listing of optional ingredients is by no means exhaustive. These and other ingredients may be employed in their customary amounts of their customary purposes so long as they do not seriously interfere with good polymer formulating practice.

Compositions comprising diethanol amide, hydroxy-functional amide ester, and polymer are usually prepared by simply admixing the various ingredients. This may be accomplished in many instances by milling. Most often the materials are admixed while the polymer is in the form of a melt. These compositions have antistatic characteristics and find many uses. Ordinarily they may be extruded into fibers, films, or other shapes, or molded, shaped, or formed into substantially any form. They are particularly useful for extrusion into films for use in packaging electronic components.

The diethanolamine content of the antistatic composition comprising the diethanol amide and the hydroxy-functional amide ester, is low or nonexistant. The molar ratio of diethanolamine to the sum of the diethanol amide and the hydroxy-functional amide ester is less than about 0.1. In most cases the molar ratio is less than about 0.07. Often the molar ratio is less than about 0.05. The antistatic compositions comprising the diethanol amide and the hydroxy-functional amide ester are preferably substantially free of diethanolamine.

Similarly, the diethanolamine content of the of the polymeric composition comprising polymer, the diethanol amide, and the hydroxy-functional amide ester, is low or nonexistant. The molar ratio of diethanolamine to the sum of the diethanol amide and the hydroxy-functional amide ester is less than about 0.1. In most cases the molar ratio is less than about 0.07. Often the molar ratio is less than about 0.05. The polymeric compositions comprising polymer, the diethanol amide, and the hydroxy-functional amide ester are preferably substantially free of diethanolamine.

The diethanolamine content of the reaction mixture produced by the process of the invention is low or nonexistant. The molar ratio of diethanolamine to the sum of the diethanol amide and the hydroxy-functional amide ester in the reaction mixture is less than about 0.1. In most cases the molar ratio is less than about 0.07. Often the molar ratio is less than about 0.05. Reaction mixtures produced by the process of the invention are preferably substantially free of diethanolamine.

The invention is further described in conjunction with the following examples which are to be considered illustrative rather than limiting, and in which all parts are parts by weight and all percentages are percentages by weight unless otherwise specified.

EXAMPLE

A one liter, 3-necked round bottom flask equipped with a thermometer, a glass inlet tube for nitrogen flow, and a water-cooled condenser which was connected via a collecting flask to a vacuum source, was charged with 235.40 grams (1.10 mole) of lauric acid, methyl ester and 105.14 grams (1.0 mole) of diethanolamine. A magnetic stirring bar was placed into the flask. While bleeding dry nitrogen through the reaction mixture, house vacuum (10.7-18.7 kilopascals, absolute) was applied and the two phase reaction mixture was slowly heated to 80° C.-85° C. Once a temperature of 80° C.-85° C. was attained, the vacuum was broken and 380 milligrams (0.00703 mole) of sodium methoxide was carefully added all at once. Nitrogen bleeding was continued and house vacuum was reapplied. Within 10 minutes the reaction mixture was homogeneous and was evolving methanol (foaming occurred). The methanol was collected in the collecting flask which was cooled with the solid carbon dioxide and acetone. After 30 minutes, reduced pressure (4.0-6.7 kilopascals, absolute) was applied and the reaction mixture was maintained at 80° C.-85° C. for 4 hours. The reaction mixture was then cooled and transferred to a bottle. The product was a thick, pale yellow liquid and weighed 299.7 grams. The yield of product was 97 percent. Gas chromatographic analysis showed the presence of no diethanolamine. Infrared spectroscopy showed ester carbonyl (1739.9 cm$^{-1}$, 6.92%) and amide carbonyl (1621.8 cm$^{-1}$, 93.08%). Acid titration indicated the presence of amine (0.118 milliequivalents/gram which corresponds to 1.24 weight percent of amine. Quantitative $^{13}$C nuclear magnetic resonance spectroscopy indicated the presence of 0.5 mole percent of ammonium salt

RC(O)O$^-$H2N$^+$(CH2CH2OH)2.

Although the present invention has been described with reference to specific details of certain embodiments thereof, it is not intended that such details should be regarded as limitations upon the scope of the invention except insofar as they are included in the accompanying claims.

We claim:

1. An antistatic composition comprising diethanol amide of monocarboxylic acid represented by the formula:

RC(O)N(CH2CH2OH)2 and hydroxy-functional amide ester represented by the formula:

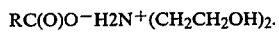
RC(O)NCH2CH2OC(O)R wherein
(a) each R is independently a hydrophobic hydrocarbon group;
(b) the molar ratio of said hydroxy-functional amide ester to said diethanol amide is in the range of from about 0.01:1 to about 0.25:1; and
(c) the molar ratio of diethanolamine to the sum of said diethanol amide and said hydroxy-functional amide ester is less than about 0.1.

2. The antistatic composition of claim 1 wherein each said hydrophobic hydrocarbon group is independently straight or branched alkyl containing from about 7 to about 29 carbon atoms, straight or branched alkenyl containing from about 9 to about 21 carbon atoms, straight or branched alkadienyl containing from about 13 to about 21 carbon atoms, or

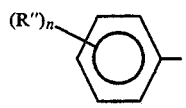

wherein each R" is independently straight or branched alkyl and the average value of n is in the range of from 0 to about 2.

3. The antistatic composition of claim 1 wherein each said hydrophobic hydrocarbon group is independently a hydrophobic hydrocarbon group corresponding to that attached to the carboxyl group of a long chain monocarboxylic acid derived from the triglyceride of a natural fat or oil.

4. The antistatic composition of claim 1 wherein each hydrophobic hydrocarbon group is undecyl.

5. The antistatic composition of claim 1 wherein the molar ratio of said hydroxy-functional amide ester to said diethanol amide is in the range of from about 0.06:1 to about 0.12:1 and wherein the molar ratio of diethanolamine to the sum of said diethanol amide and said hydroxy-functional amide ester is less than about 0.05.

6. The antistatic composition of claim 1 which is substantially free of diethanolamine.

7. A polymeric composition comprising polyolefin in admixture with an antistatic composition, said antistatic composition comprising diethanol amide of monocarboxylic acid represented by the formula:

RC(O)N(CH2CH2OH)2 and hydroxy-functional amide ester represented by the formula:

RC(O)NCH2CH2OC(O)R wherein
(a) each R is independently a hydrophobic hydrocarbon group;
(b) the molar ratio of said hydroxy-functional amide ester to said diethanol amide is in the range of from about 0.01:1 to about 0.25:1; and
(c) the molar ratio of diethanolamine to the sum of said diethanol amide and said hydroxy-functional amide ester is less than about 0.1.

8. The polymeric composition of claim 7 wherein each said hydrophobic hydrocarbon group is independently straight or branched alkyl containing from about 7 to about 29 carbon atoms, straight or branched alkenyl containing from about 9 to about 21 carbon atoms, straight or branched alkadienyl containing from about 13 to about 21 carbon atoms, or

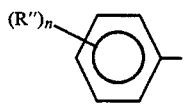

wherein each R″ is independently straight or branched alkyl and the average value of n is in the range of from 0 to about 2.

9. The polymeric composition of claim 7 wherein each said hydrophobic hydrocarbon group is independently a hydrophobic hydrocarbon group corresponding to that attached to the carboxyl group of a long chain monocarboxylic acid derived from the triglyceride of a natural fat or oil.

10. The polymeric composition of claim 7 wherein each hydrophobic hydrocarbon group is undecyl.

11. The polymeric composition of claim 7 wherein the ratio of the sum of the weights of said diethanol amide and said hydroxy-functional amide ester to the weight of said polymer is in the range of from about 0.0005:1 to about 0.05:1.

12. The polymeric composition of claim 7 wherein said polyolefin is polyethylene.

13. The polymeric composition of claim 7 wherein the molar ratio of said hydroxy-functional amide ester to said diethanol amide is in the range of from about 0.06:1 to about 0.12:1 and wherein the molar ratio of diethanolamine to the sum of said diethanol amide and said hydroxy-functional amide ester is less than about 0.05.

14. The polymeric composition of claim 7 which is substantially free of diethanolamine.

15. The polymeric composition of claim 7 wherein the ratio of the sum of the weights of said diethanol amide and said hydroxy-functional amide ester to the weight of said polymer is in the range of from about 0.0025:1 to about 0.0075:1.

* * * * *